United States Patent
Ziembicki

(10) Patent No.: US 9,433,151 B2
(45) Date of Patent: Sep. 6, 2016

(54) CASTER WHEEL ASSEMBLY OF A PICKUP FOR AN AGRICULTURAL MACHINE

(71) Applicant: CNH Industrial America LLC, New Holland, PA (US)

(72) Inventor: Lukasz Ziembicki, Ilow (PL)

(73) Assignee: CHN Industrial America LLC, New Holland, PA (US)

( * ) Notice: Subject to any disclaimer, the term of this patent is extended or adjusted under 35 U.S.C. 154(b) by 0 days.

(21) Appl. No.: 14/432,892

(22) PCT Filed: Sep. 27, 2013

(86) PCT No.: PCT/EP2013/070299
§ 371 (c)(1),
(2) Date: Apr. 1, 2015

(87) PCT Pub. No.: WO2014/053426
PCT Pub. Date: Apr. 10, 2014

(65) Prior Publication Data
US 2015/0250100 A1    Sep. 10, 2015

(30) Foreign Application Priority Data
Oct. 1, 2012   (BE) .................................. 2012/0650

(51) Int. Cl.
*B60B 33/06* (2006.01)
*A01D 89/00* (2006.01)
*B60B 33/00* (2006.01)
*B60B 33/04* (2006.01)

(52) U.S. Cl.
CPC ........... *A01D 89/004* (2013.01); *B60B 33/006* (2013.01); *B60B 33/0021* (2013.01); *B60B 33/0076* (2013.01); *B60B 33/045* (2013.01); *B60Y 2200/22* (2013.01); *Y10T 16/18* (2015.01)

(58) Field of Classification Search
CPC . Y10T 16/195; Y10T 16/196; A01D 89/004; A61G 2005/1051; A61G 2007/0528; B60B 33/0005; B60B 33/0055; B60B 33/0057; B60B 33/006; B60B 33/0065; B60B 33/0068; B60B 33/0073; B60B 33/0076; B60B 33/02; B60G 2200/445; B62B 3/001; B62B 2301/00; B62B 2301/04; B62B 2301/046; B62B 2301/0465
See application file for complete search history.

(56) References Cited

U.S. PATENT DOCUMENTS

| | | | | | |
|---|---|---|---|---|---|
| 2,105,246 | A | * | 1/1938 | Horsfield | B60G 15/02 16/35 D |
| 2,192,282 | A | * | 3/1940 | Warner | B64C 25/50 16/35 D |
| 2,213,967 | A | * | 9/1940 | Roche | B64C 25/50 16/31 A |
| 2,974,737 | A | * | 3/1961 | Dlugosch | A01B 73/02 172/456 |
| 3,194,578 | A | * | 7/1965 | Kiecker | B62D 13/04 16/35 R |

(Continued)

FOREIGN PATENT DOCUMENTS

| | | |
|---|---|---|
| CH | 687951 A5 | 4/1997 |
| DE | 4003202 A1 | 8/1990 |

(Continued)

*Primary Examiner* — Chuck Mah
(74) *Attorney, Agent, or Firm* — Patrick M. Sheldrake

(57) ABSTRACT

A caster wheel assembly of a pickup for an agricultural machine, comprising a wheel on a carrier shaft mounted rotatably within a bushing of a pickup arm. The wheel is biased by a spring to be oriented in a predetermined direction relative to the pickup arm. The spring is a helical spring mounted coaxially with the carrier shaft between the wheel and the pickup arm.

11 Claims, 3 Drawing Sheets

(56) References Cited

U.S. PATENT DOCUMENTS

| | | | | |
|---|---|---|---|---|
| 3,654,999 | A | * | 4/1972 | Fischer ............... A01B 73/067 16/35 R |
| 3,771,302 | A | | 11/1973 | Vogt |
| 4,092,760 | A | * | 6/1978 | Loewe .................... E04G 1/24 16/29 |
| 4,154,451 | A | * | 5/1979 | Young ................. A01B 73/067 172/311 |
| 4,202,559 | A | * | 5/1980 | Piazza, Jr. .............. A63C 17/01 280/11.27 |
| 4,212,093 | A | * | 7/1980 | Lombard ........... A63C 17/0033 16/35 D |
| 4,246,677 | A | * | 1/1981 | Downing ............... B60B 33/02 16/35 R |
| 4,280,246 | A | * | 7/1981 | Christensen ........... B60B 33/02 16/35 D |
| 4,324,093 | A | * | 4/1982 | van der Lely ......... A01D 8/148 56/377 |
| 4,502,546 | A | * | 3/1985 | Moos ................. A01B 73/067 172/311 |
| 4,580,800 | A | * | 4/1986 | Upton ................. B62B 3/1492 16/35 R |
| 4,679,662 | A | * | 7/1987 | Nordskog ........... B60B 33/0028 16/35 R |
| 5,355,664 | A | * | 10/1994 | Zenner ................. A01D 34/82 16/35 D |
| 5,562,167 | A | | 10/1996 | Honey |
| 5,727,285 | A | * | 3/1998 | Goman ................. B60B 33/023 16/322 |
| 6,134,748 | A | * | 10/2000 | Kuo ....................... B60B 33/06 16/34 |
| 6,152,240 | A | | 11/2000 | Nonhoff et al. |
| 6,163,924 | A | * | 12/2000 | Ward, Jr. ........... B60B 33/0039 16/35 R |
| 6,336,313 | B1 | | 1/2002 | Bonnewitz |
| 6,553,748 | B2 | | 4/2003 | Josset et al. |
| 6,810,653 | B2 | | 11/2004 | Derscheid |
| 7,000,930 | B2 | * | 2/2006 | Smith ................. A63C 17/0026 280/87.021 |
| 7,077,220 | B2 | * | 7/2006 | Dunn .................... B60B 35/003 16/35 D |
| 7,083,175 | B1 | * | 8/2006 | Liu ........................ B60B 1/006 16/35 R |
| 2011/0254241 | A1 | * | 10/2011 | Piontek .................... F16F 7/00 280/124.1 |
| 2013/0305683 | A1 | | 11/2013 | Ziembicki |

FOREIGN PATENT DOCUMENTS

| | | |
|---|---|---|
| EP | 0383121 A1 | 8/1990 |
| EP | 0386430 A2 | 9/1990 |
| EP | 2113396 A1 | 11/2009 |

* cited by examiner

CASTER WHEEL ASSEMBLY OF A PICKUP FOR AN AGRICULTURAL MACHINE

This application is the U.S. National Stage filing of International Application Serial No. PCT/EP2013/070299 filed on Sep. 27, 2013 which claims priority to Belgian Application BE2012/0650 filed Oct. 1, 2012, each of which is incorporated herein by reference in its entirety.

FIELD OF THE INVENTION

The present invention relates to a caster wheel assembly of a pickup which can be used with an agricultural machine such as a round baler, a square baler, a forage harvester or a combine harvester.

BACKGROUND OF THE INVENTION

Certain agricultural machines, such as balers and forage harvesters, are required to pick up crop material that has been cut but still lies on the ground. The mechanism used to gather the crop material from the ground and feed it into the machine for processing is known as, and herein referred to as, a pickup. A pickup typically comprises a drum rotatably mounted on a frame and having radially projecting tines to drive the crop material upwards, past a guide (also known as a windguard) and then into a feed channel through which the crop material is conveyed into the machine for processing. The construction of the pickup is not of importance to the present invention and has been described only by way of general background.

It is known for a pickup to be supported on two ground wheels and these may be adjustable in order to allow the ground clearance to be adjusted. As the ground wheels are provided only for support, and are not used for steering, they are commonly designed as caster wheels so that they align themselves automatically with the direction of travel of the machine. As is known, a caster wheel is pivotable about a generally vertical axis, generally known as and herein referred to as a caster axis. Typically, the point of contact of the wheel with the ground is offset from the caster axis. As a result, drag rotates the wheel such that its point of contact with the ground always lines up behind the caster axis in the direction of travel thereby causing the wheel to point automatically in the correct direction.

A problem arises with this wheel design when the pickup is transported on public roads with the wheels raised off the ground. When they are not in contact with the ground, the caster wheels can rotate freely and can move to a position where they project laterally beyond the sides of the pickup. In such a position, they may increase the width of the pickup beyond legally permissible limits for transportation on a public highway.

EP 1 362 506 discloses a crop pickup arrangement and height gauge arrangement, in which on the one hand, a skid shoe and on the other hand, a wheel are attached to a pivot arm assembly. The wheel is supported by the assembly for rotation about a horizontal axis and the assembly is itself mounted on the pickup to pivot about a second horizontal axis. This arrangement, which acts in the same way as a motorcycle swinging arm suspension, allows height adjustment of the wheel but the wheel has no caster action and does not align automatically with the direction of travel.

EP 2 113 396 discloses a pickup support wheel mounted on a carrier secured to a pivot shaft that defines the caster axis of the wheel. The pivot shaft can rise and fall relative to the frame of the pickup and, when it falls to the limit of its travel, a pin projecting from the pivot shaft interacts with a cam surface to cause the wheel to rotate into a desired position. However, during normal operation of the pickup there is no interaction between the pin and the cam.

WO 2012/072436 discloses a pickup for an agricultural machine having a frame carrying a pickup mechanism and supported on the ground by means of two support wheels, wherein each support wheel is mounted for rotation about a generally horizontal axis on a carrier that is connected to the frame of the pickup for rotation about a generally vertical caster axis, the projection of the caster axis intersecting the ground at a point offset from the point of contact of the wheel with the ground. Each carrier is connected by a respective spring to a point fixed relative to the frame of the pickup, the spring biasing the carrier to cause the support wheel to be oriented in a predetermined direction relative to the frame of the pickup. In the presented embodiment, the spring is mounted below an arm of the frame of the pickup. When the support wheels are raised from the ground the springs acting on their carriers bias them into their predetermined direction, also known as the parked position, in which they do not project impermissibly beyond the frame of the pickup. However, the spring is attached such that it limits the range of rotation of the wheel. In particular, the wheel is not able to rotate substantially more than 180 degrees from its initial position, which may cause problems when manoeuvring backwards on an uneven terrain, when the wheel is biased to a position rotated 180 degrees with respect to the bias position when manoeuvring forwards.

Therefore, there is a need for an improved caster wheel assembly of a pickup for an agricultural machine which will bias the wheel to a predetermined direction, but provide greater freedom of rotation of the wheel while manoeuvring forwards and backwards.

SUMMARY OF THE INVENTION

The object of the invention is a caster wheel assembly of a pickup for an agricultural machine, comprising a wheel on a carrier shaft mounted rotatably within a bushing of a pickup arm, the wheel being biased by a spring to be oriented in a predetermined direction relative to the pickup arm, characterized in that the spring is a helical spring mounted coaxially with the carrier shaft between the wheel and the pickup arm.

Preferably, the helical spring is attached at its one end to the carrier shaft and at its second end to the bushing.

Preferably, the helical spring is mounted above the pickup arm.

Preferably, the helical spring is mounted below the pickup arm.

Preferably, the helical spring is mounted inside the carrier shaft.

Preferably, the helical spring is mounted outside the carrier shaft.

Preferably, the helical spring is protected by a cover.

Preferably, the helical spring is mounted inside the bushing housing.

Preferably, the helical spring is mounted releasably.

Preferably, the helical spring allows the wheel to rotate by at least 270 degrees, preferably by at least 360 degrees.

Preferably, the point of contact between the wheel and the ground lies in line with the projection of the axis of the carrier shaft.

Preferably, the point of contact between the wheel and the ground is offset from the point (49A) of the projection of the axis of the carrier shaft onto the ground.

The caster wheel assembly according to the invention allows dampening the movement of the wheel during field operation and aligns the caster wheel during road transport to a desired position, while it allows freedom in adjustment of the wheel orientation when manoeuvring the pickup both forwards and backwards.

Particular and preferred aspects of the invention are set out in the accompanying independent and dependent claims. Features from the dependent claims may be combined with features of other dependent claims as appropriate and not merely as explicitly set out in the claims.

BRIEF DESCRIPTION OF THE DRAWINGS

The object of the invention is shown by means of exemplary embodiment on the drawings, in which.

DETAILED DESCRIPTION OF THE DRAWINGS

Figure 1:
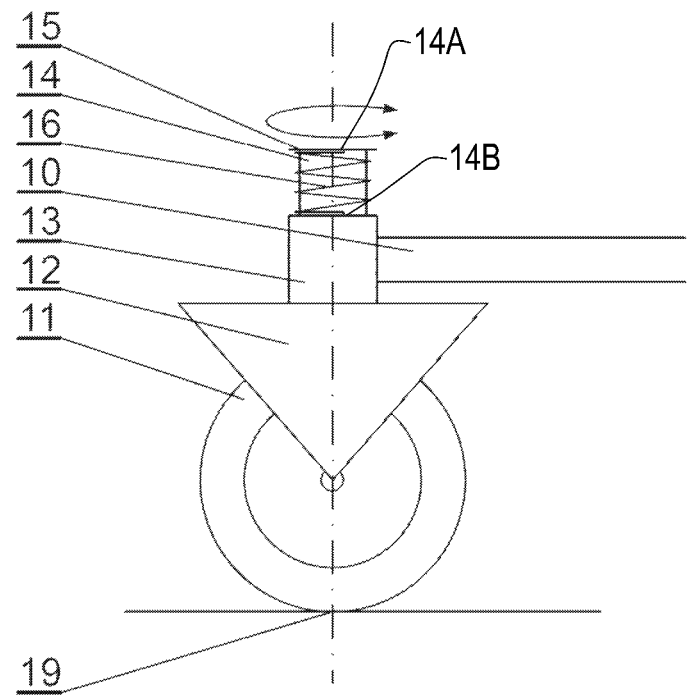
FIG. 1 shows a side view of a first embodiment of the caster wheel assembly.
Figure 2:
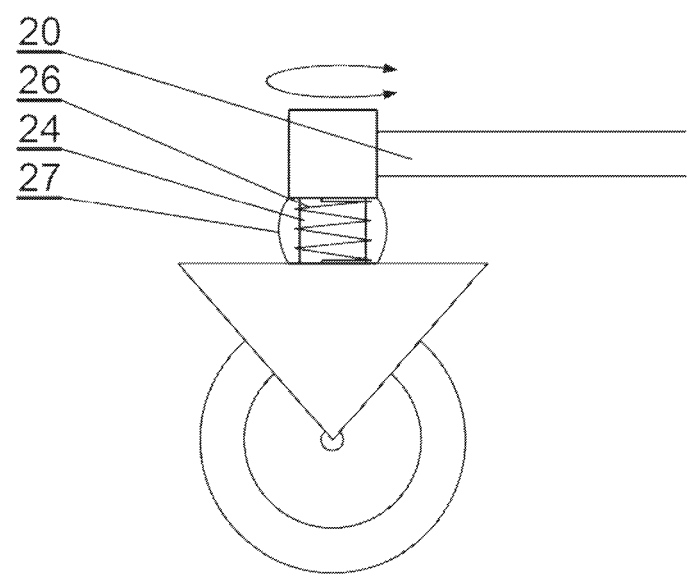
FIG. 2 shows a side view of a second embodiment of the caster wheel assembly.

The caster wheel assembly as shown in FIGS. 1 and 2 comprises a wheel 11 mounted on a carrier 12 with a carrier shaft 14 that is rotatably mounted in a bushing 13 fixed to an arm 10. The arm 10 forms part of the frame of the pickup. The arm 10 can be pivoted to alter the ride height of the pickup.

As shown in the first embodiment of FIG. 1, the point of contact 19 between the wheel 11 and the ground lies in line with the projection of the axis of the carrier shaft 14. This reduces the force necessary to bias the wheel 11 in the direction of travel.

A helical spring 16 is arranged coaxially with the carrier shaft 14 and is attached at its one end 14A to the carrier shaft 14 and at its second end 14B to the bushing 13, such as to bias the orientation of the carrier shaft 14 (and therefore the wheel 11) with respect to the bushing 13 (and therefore with respect to the arm 10). Preferably, the spring 16 is configured to bias the wheel 11 such that it steers the pickup to travel in a straight line. In other words, when spring 14 has no torsional force applied to it, the carrier 12 and wheel are oriented so that the plane of the wheel is in the direction of travel.

The helical spring 16 allows rotation of the wheel 11 at least by 270 degrees, and preferably by at least 360 degrees, to allow freedom in adjustment of the wheel orientation when manoeuvring the pickup both forwards and backwards. At the same time, the spring 16 allows dampening the movement of the wheel 11 during field operation and aligns the caster wheel during road transport to a desired position.

The helical spring 16 is shown in FIG. 1 as mounted around the outside of the carrier shaft 14 and above the arm 10 to the top 15 of the carrier shaft 14. This preferable embodiment allows easy replacement of the spring 16 and protects it from damage from ground obstacles. Therefore, the ends of the spring 16 are preferably mounted releasably, such as by bolts, to the carrier shaft 14 at 14A and to the bushing 13 at 14B, for easy manual replacement of the spring.

FIG. 2 shows a second embodiment, in which the helical spring 26 is mounted along the shaft 24 below the arm 20. A protective cover 27 may be applied at the outside of the spring.

Figure 5:
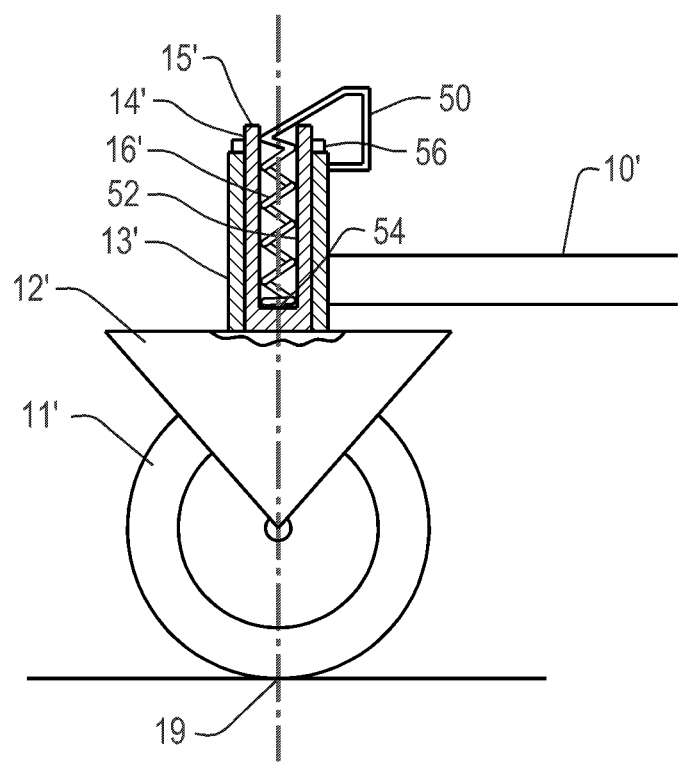

As an alternative to embodiments shown in FIGS. 1 and 2, the springs 16, 26 can be mounted inside the carrier shaft 14, 24, as shown in FIG. 5. The various elements of the combination illustrated in FIG. 5 are similar to those in FIG. 1, so generally corresponding parts will be given the same numbers with a prime notation. Thus, the arm 10' supports a bushing 13'. Bushing 13' journals and supports a carrier shaft 14' that is mounted to carrier 12 providing a journal mounting for wheel 12'. However, carrier shaft 14 has a central recess 52 extending to an upper open end 15'. Carrier support shaft 14' has a flange 56 affixed to it to retain the carrier shaft 14' within bushing 13'. The helical spring 16' is secured to the carrier shaft 14' at the base 54 of the central recess 52. The upper end of helical spring 16' has an extension, which may be formed from the same spring material, that extends beyond the bushing 13 to be secured to bushing 13' that is secured to arm 10'. Thus, the orientation of helical spring 16' in its relaxed state is set by the relative positions of the end of spring 16' at the bottom of recess 54 and the extension 50. Any pivoting motion of the carrier 12' and wheel 11' from the set direction (preferably in a forward direction) is resisted by the coil spring 16' to bring it back to the relaxed orientation of the coil spring 16'.

Furthermore, the spring 16, 26 can be mounted at its one end below the arm 10, 20 and at its other end above the arm 10, 20 to allow use of a longer spring as compared to that of FIG. 1 or 2.

Figure 3:
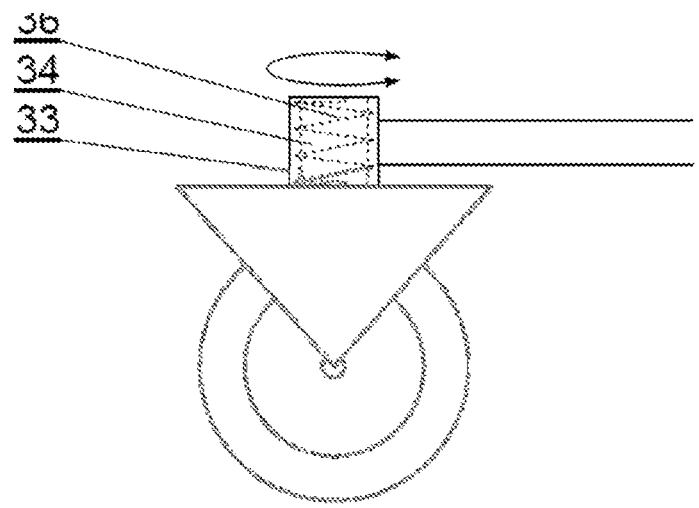
FIG. 3 shows a side view of a third embodiment of the caster wheel assembly.

FIG. 3 shows a third embodiment, wherein a spring 36 is mounted on the shaft 34 inside the housing of the bushing 33.

Figure 4:
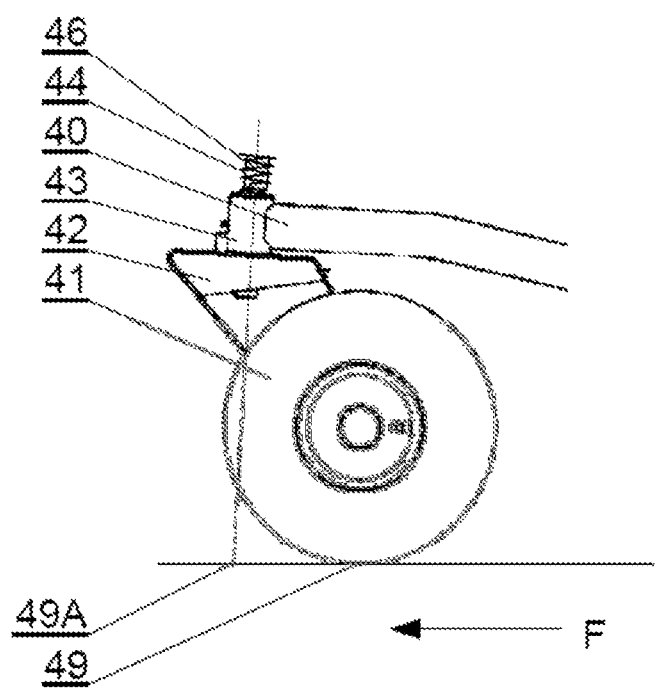
FIG. 4 shows a side view of a fourth embodiment of the caster wheel assembly; and, FIG. 5 shows a side view of a fifth embodiment of the caster wheel assembly.

FIG. 4 shows a fourth embodiment, wherein the wheel 41 is mounted on a carrier 42 with a shaft 44 that is rotatably mounted in a bushing 43 fixed to an arm 40, but as compared to FIG. 1, the point of contact 49 between the wheel 41 and the ground is offset from the point 49A of the projection of the axis of the carrier shaft 44 onto the ground. As a result, the wheel 41 always lines up behind the carrier shaft 44 in the direction of travel, which is designated by the arrow F. The spring 46 is arranged in a manner equivalent to that as shown in FIG. 1. As an alternative, any of the other ways of arranging spring 46, as shown in FIG. 2 or FIG. 3 are likewise also possible.

It is to be understood that the presented embodiments describe only the most characteristic features of the invention. A skilled person will realize that various modifications may be made to the presented embodiments, such as implementing the features known from other caster wheel assemblies of pickup mechanisms related to the configuration of the pickup arm, the mounting of the carrier shaft within the bushing etc.

The invention claimed is:

1. A caster wheel assembly of a pickup for an agricultural machine, comprising:
   a wheel on a carrier shaft mounted rotatably within a bushing of a pickup arm, the wheel biased by a spring to be oriented in a predetermined direction relative to the pickup arm, wherein the spring is a helical spring positioned coaxially with the carrier shaft and attached at its one end to the carrier shaft and at its second end to the bushing.

2. The caster wheel assembly according to claim 1, wherein the helical spring is positioned above the pickup arm.

3. The caster wheel assembly according to claim 1, wherein the helical spring is positioned below the pickup arm.

4. The caster wheel assembly according to claim 1, wherein the helical spring is positioned inside the carrier shaft.

5. The caster wheel assembly according to claim 1, wherein the helical spring is positioned outside the carrier shaft.

6. The caster wheel assembly according to claim 5, wherein the helical spring is protected by a cover.

7. The caster wheel assembly according to claim 1, wherein the helical spring is positioned inside the bushing housing.

8. The caster wheel assembly according to claim 1, wherein the helical spring is attached releasably.

9. The caster wheel assembly according to claim 1, wherein the helical spring allows the wheel to rotate by at least 270 degrees to at least 360 degrees.

10. The caster wheel assembly according to claim 1, wherein the point of contact between the wheel and the ground lies in line with the projection of the axis of the carrier shaft.

11. The caster wheel assembly according to claim 1, wherein the point of contact between the wheel and the ground is offset from the point of the projection of the axis of the carrier shaft onto the ground.

\* \* \* \* \*